US012741611B2

(12) United States Patent
Singh et al.

(10) Patent No.: US 12,741,611 B2
(45) Date of Patent: Sep. 22, 2026

(54) APPROACH INTENT PROBABILITY DETERMINATION ADAPTIVE TO CHARACTERISTIC INFORMATION OF AN INITIATOR DEVICE

(71) Applicant: Infineon Technologies AG, Neubiberg (DE)

(72) Inventors: Ajinder Pal Singh, Allen, TX (US); Kameswara Medapalli, Saratog, CA (US); Daniel Lee, Salt Lake City, UT (US)

(73) Assignee: Infineon Technologies AG, Neubiberg (DE)

( * ) Notice: Subject to any disclaimer, the term of this patent is extended or adjusted under 35 U.S.C. 154(b) by 314 days.

(21) Appl. No.: 18/651,897

(22) Filed: May 1, 2024

(65) Prior Publication Data

US 2025/0340183 A1 Nov. 6, 2025

(51) Int. Cl.

| | |
|---|---|
| ***B60R 25/24*** | (2013.01) |
| ***G07C 9/00*** | (2020.01) |
| ***H04B 17/318*** | (2015.01) |

(52) U.S. Cl.

CPC ........ *B60R 25/245* (2013.01); *G07C 9/00309* (2013.01); *H04B 17/318* (2015.01); *B60R 2325/101* (2013.01); *B60R 2325/205* (2013.01); *G07C 2009/00793* (2013.01); *G07C 2009/00984* (2013.01); *G07C 2209/63* (2013.01)

(58) Field of Classification Search

CPC ............ B60R 25/245; B60R 2325/101; B60R 2325/205

See application file for complete search history.

(56) References Cited

U.S. PATENT DOCUMENTS

| | | | | |
|---|---|---|---|---|
| 2019/0135229 | A1* | 5/2019 | Ledvina | H04W 12/64 |
| 2022/0198850 | A1* | 6/2022 | Buyuksahin | G06F 1/3209 |
| 2023/0013034 | A1* | 1/2023 | Tertinek | H04B 1/69 |
| 2024/0051497 | A1* | 2/2024 | Yeung | B60R 25/01 |
| 2024/0428630 | A1* | 12/2024 | Rowe | G06F 21/35 |

* cited by examiner

*Primary Examiner* — Nabil H Syed

(74) *Attorney, Agent, or Firm* — Banner & Witcoff, Ltd.

(57) ABSTRACT

A responder device, including: a wireless module operable to receive a wireless signal from an initiator device; and processor circuitry coupled to the wireless module and operable to: monitor a distance between the responder device and the initiator device based on the wireless signal; determine an approach intent probability for the initiator device using an algorithm that is based on the distance between the responder device and the initiator device and is adaptive according to characteristic information of the initiator device; and initiate a secure ranging session with the initiator device when the approach intent probability exceeds a predetermined approach intent probability threshold.

15 Claims, 6 Drawing Sheets

200

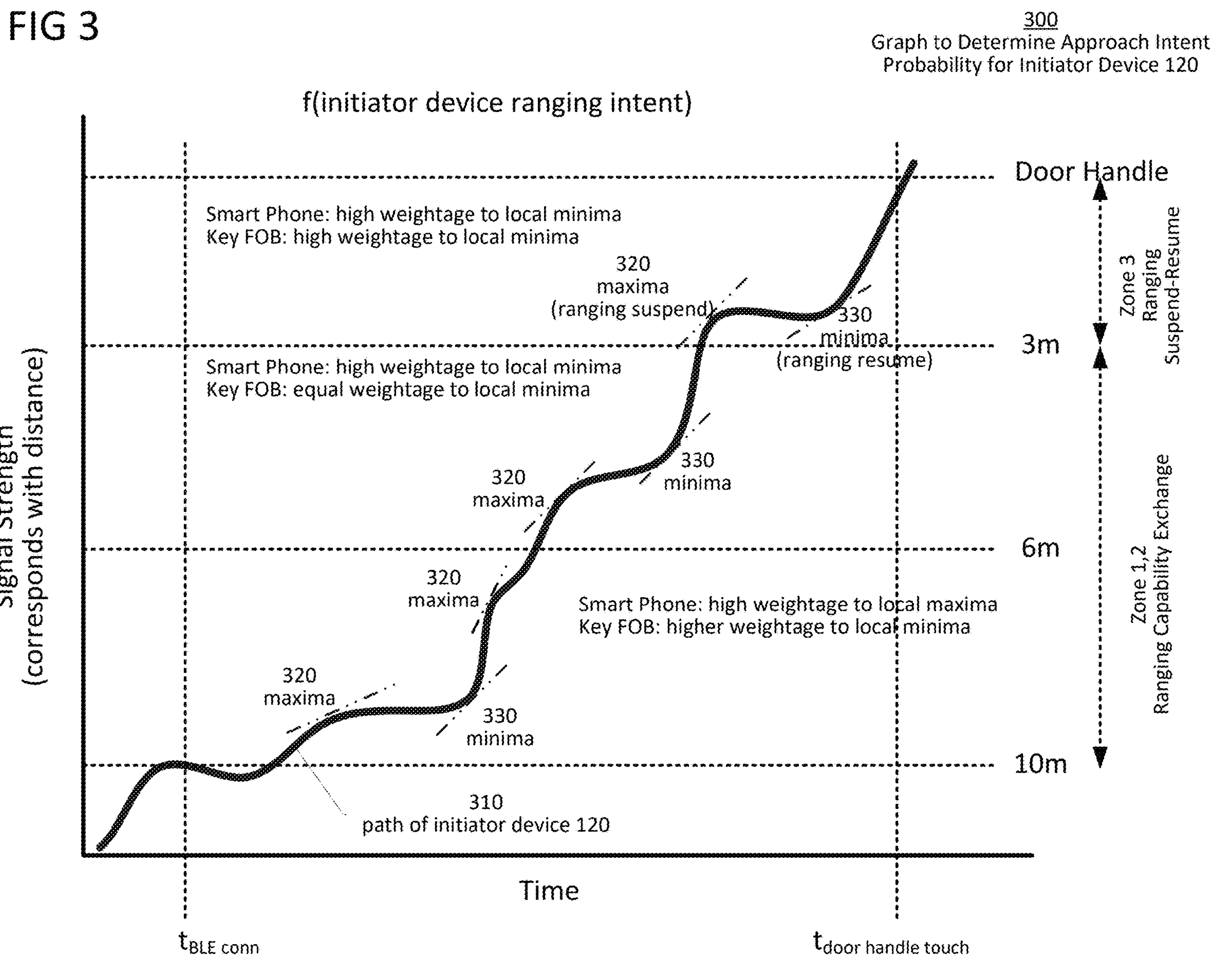
FIG 3
300
Graph to Determine Approach Intent
Probability for Initiator Device 120
f(initiator device ranging intent)
Signal Strength
(corresponds with distance)
Door Handle
3m
6m
10m
Zone 3
Ranging
Suspend-Resume
Zone 1,2
Ranging Capability Exchange
Smart Phone: high weightage to local minima
Key FOB: high weightage to local minima
320
maxima
(ranging suspend)
330
minima
(ranging resume)
Smart Phone: high weightage to local minima
Key FOB: equal weightage to local minima
320
maxima
330
minima
320
maxima
Smart Phone: high weightage to local maxima
Key FOB: higher weightage to local minima
320
maxima
330
minima
310
path of initiator device 120
Time
$t_{BLE\ conn}$
$t_{door\ handle\ touch}$

FIG 4

400
Table of Sum of Approach Intent Probability for Initiator Device 120

<table>
<tr><th>Zone</th><th>Algorithm ∑P(intent)</th></tr>
<tr><td>1<br>(10m to 6m)</td><td>Key FOB weightage > smart phone weightage (power saving)<br>If (key FOB||device) & f(device ranging intent) = local maxima<br>Then P(intent) = P(intent)*weightage</td></tr>
<tr><td>2<br>(6m to 3m)</td><td>Key FOB weightage < smart phone weightage (power saving)<br>If (key FOB||device) & f(device ranging intent) = local minima<br>Then P(intent) = P(intent)*weightage</td></tr>
<tr><td>3<br>(3m to door handle)</td><td>Smart phone weightage = key FOB weightage (device user experience)<br>If (key FOB||device) & f(device ranging intent) = local minima<br>Then P(intent) = P(intent)*weightage</td></tr>
</table>

500
MAC Timing Grid Synchronization
Initiator 120
Responder 110
UWB Module 1
UWB Module 2
UWB Module 7
$T_{packet\ max}$
$T_{inter\text{-}packet}$
T1
T2
R3
R4
R9
T10
T11
R1
R2
T3
T4
T9
R10
R11
Ranging Round $T_{Round}^{k}$
Tx
Rx
Ty
Ry
SP0 Packet Type (data packet)
SP3 Packet Type (ranging packet)

CCC Specification Parameters Optimizable

| CCC Specification Parameter | Prior System (Responder Device 110 does not know if Initiator Device 120 is a Smartphone or a Key FOB) | Disclosed System (Responder Device 110 knows that Initiator Device 120 is a Key FOB) |
|---|---|---|
| $N^k_{Responder}$ | 4 | 4 |
| $N^k_{RAN}$ | 3 | 1 |
| $T^k_{Block} = N^k_{RAN} x T_{Block\_min}$ | 288ms=3*96ms | 96ms=1*96ms |
| $T^k_{Slot} = N^k_{Chap\_per\_slot} x T_{Chap}$ | $N^k_{Chap\_per\_slot} = 6$<br>$T^k_{Slot} = N^k_{Chap\_per\_slot} x T_{Chap} = 6x\frac{1}{3} = 2ms$ | $N^k_{Chap\_per\_slot} = 3$<br>$T^k_{Slot} = N^k_{Chap\_per\_slot} x T_{Chap} = 3x\frac{1}{3} = 1ms$ |
| $T^k_{Round} = N^k_{Slot\_per\_Round} x T^k_{Slot}$ | Minimum number of slots for one complete ranging round: 8<br>$T^k_{Round}$=8x2ms=16ms | Minimum number of slots with 4 responders: 8<br>$T^k_{Round}$=8x1ms=8ms |
| $N^k_{Round} = T^k_{Block} / T^k_{Round}$ | 288ms/16ms=18→18 AoA calculations in 288ms<br>LESS POWER OPTIMIZED | 96ms/8ms=18→12 AoA calculations in 96ms<br>MORE POWER OPTIMIZED |
| $F^k_{Ranging} = 1 / T^k_{Block}$ | =1/288ms=3.47Hz | =1/96ms=10.4Hz |

APPROACH INTENT PROBABILITY DETERMINATION ADAPTIVE TO CHARACTERISTIC INFORMATION OF AN INITIATOR DEVICE

TECHNICAL FIELD

The disclosure relates to a digital key and, more particularly, to authenticating a digital key in a manner adaptive according to a characteristic information of its initiator device.

BACKGROUND

A digital key is a digitized version of a physical key used for multiple functions, including vehicle access. It can be integrated into devices like smartphones and transmitted using wireless communication technologies like ultra-wideband (UWB), Bluetooth low energy (BLE), and BLE channel sounding.

The Car Connectivity Consortium (CCC) is an international association of vehicle manufacturers, suppliers, and technology companies that collaborate to develop standards for how vehicles communicate with other devices, such as smartphones.

The CCC, Digital Key Release 3, Technical Specification (hereinafter the "CCC Specification") requires an initiator device to generate device ranging intent subevents to notify a vehicle that an initiator device may be approaching a vehicle. UWB ranging may be required. Between three meters away and the point where the initiator device user is about to touch the vehicle door handle, the vehicle uses high rate pulse (HRP) repetition secure ranging to determine if there is sufficient confidence in the proximity of the initiator device to generate a vehicle unlock event or a vehicle lock event. HRP repetition secure ranging requires more power than low rate pulse (LRP) repetition secure ranging. The CCC Specification was developed considering the initiator device to be a smartphone, not a key FOB (frequency operated buttons). A smartphone has a bigger battery than a key FOB and can afford to waste more power on tasks than a key FOB. Implementing HRP secure ranging in a key FOB is a concern for vehicle original equipment manufacturers (OEMs) due to battery life issues.

BRIEF DESCRIPTION OF THE FIGURES

FIG. 3 illustrates a graph of signal strength versus time to determine an initiator device approach intent probability, in accordance with aspects of the disclosure.

FIG. 4 illustrates a table of a sum of approach intent probability for an initiator device by distance zone, in accordance with aspects of the disclosure.

FIG. 6 illustrates a table of CCC Specification parameters that are optimizable in accordance with aspects of the disclosure.

DETAILED DESCRIPTION

The present disclosure is directed to out-of-band (OoB) negotiations between a vehicle and a device to ascertain whether the device is a smartphone or a key FOB. This determination allows for the optimization of algorithms designed to conserve power in a key FOB without compromising a device user's passive vehicle entry experience.

I. System Overview

A. System Components

Figure 1:
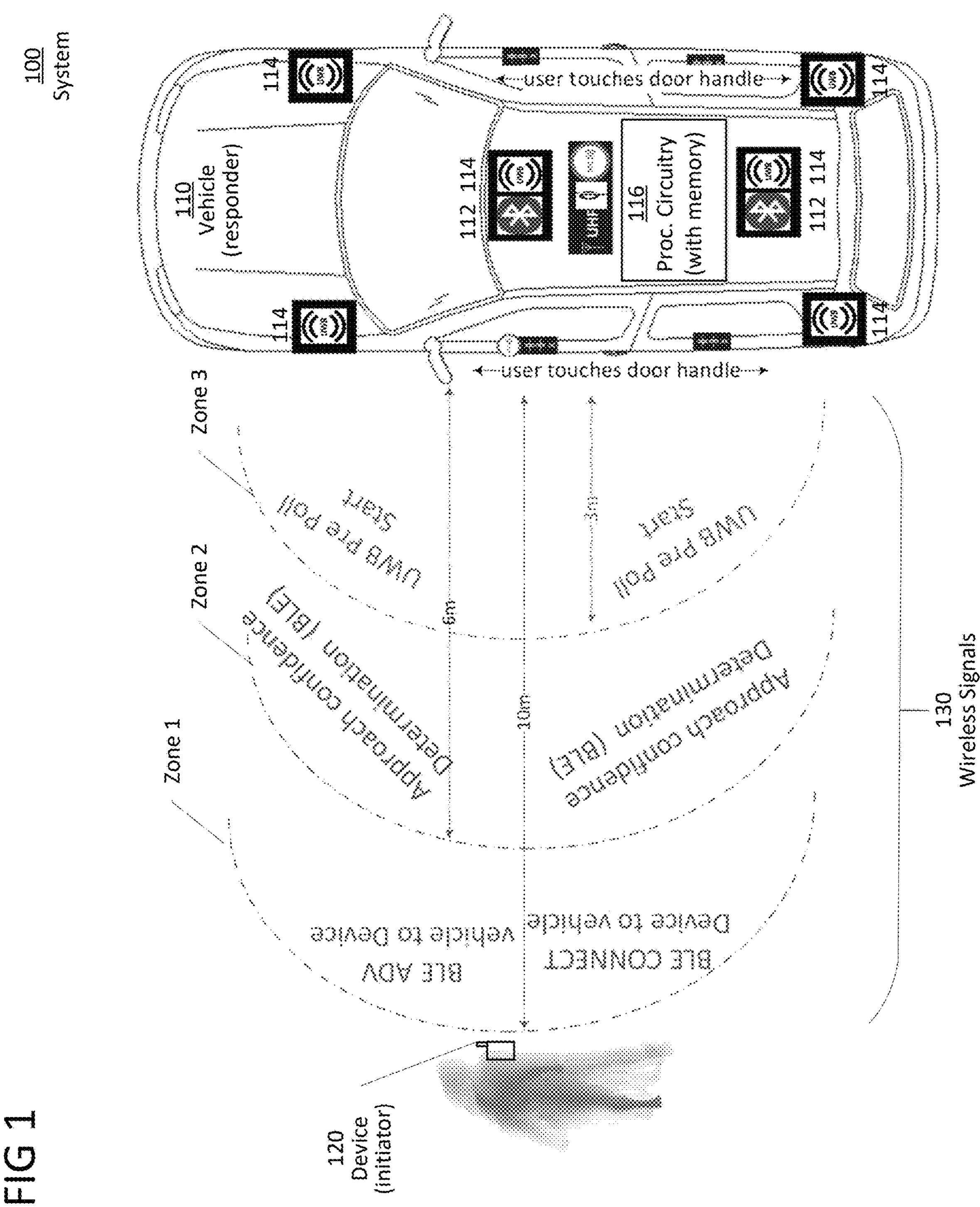
FIG. 1 illustrates a system, in accordance with aspects of the disclosure.

FIG. 1 illustrates a system 100, in accordance with aspects of the disclosure.

The system 100 includes a vehicle 110 and a device 120. In the CCC Specification, the vehicle 110 is referred to as a "responder" (responder device) and the device is referred to as an "initiator" (initiator device). The responder device 110 comprises wireless modules 112, 114 and processor circuitry 116, which has memory.

The wireless modules 112, 114 are operable to transmit/receive wireless signals 130 to/from the initiator device 120. They include BLE modules 112 and UWB modules 114. The BLE modules 112 manage Bluetooth communications between the responder device 110 and the initiator device 120 to determine whether the initiator device 120 is approaching the responder device 110. The figure depicts two BLE modules 112, but any number of BLE modules 112 may be utilized as needed.

In this example, seven UWB modules 114 are located at various locations on responder device 110. However, any number of UWB modules 114 may be utilized as needed. These modules are used to identify the location of the initiator device 120 using known angle of arrival (AoA) techniques. The UWB modules 114 manage UWB ranging sessions between the initiator device 120 and the responder device 110 to establish a secure UWB ranging session. UWB consumes more power than BLE. A smartphone can afford to waste battery power, but a key FOB should keep the number of ranging rounds of the HRP UWB secure ranging session to a minimum. In a UWB ranging session, a secure ranging key, sometimes referred to as an ultra-wideband (UWB) ranging secret key (URSK), may be used to derive other keys used to encrypt messages exchanged between the responder device 110 and the initiator device 120.

The processor circuitry 116 is coupled to the wireless modules 112, 114. The processor circuitry 116 is operable to control operations of the responder device 110 and includes at least one processor, such as a microcontroller unit (MCU), a central processing unit (CPU), a graphics processing unit (GPU), or the like. The processor circuitry 116 may control other components included in the responder device 110 to perform operations such as monitoring the distance between the responder device 110 and the initiator device 120, determining an approach intent probability for the initiator device 120, and initiating a secure ranging session with the initiator device 120. Throughout this disclosure, the operations of the processor circuitry 116 may be described as being generally performed by the responder device 110 for ease of explanation.

The initiator device 120 could be, for example, a smartphone, a key FOB, or another mobile device. The initiator device 120 has a digital key.

B. Initiator Device 120 Physical Approach of Responder Device 110

An area surrounding the responder device 110 is divided into a plurality of distance zones as the initiator device 120 approaches the responder device 110. In this case, these zones are zone 1 (ten to six meters from the responder device 110), zone 2 (six to three meters), and zone 3 (three meters to the door handle). In zone 3 (i.e., the distance zone closest to the responder device 110), the wireless signals 130 are UWB signals, and in zones 1 and 2, the wireless signals 130 are Bluetooth Low Energy (LE) signals. As the initiator device 120 approaches the responder device 110, it passes through zones 1, 2, and then 3.

1. Zone 1 (Ten to Six Meters From Responder Device 110)

When the initiator device 110 enters zone 1, it wirelessly connects to a BLE module 112 of the responder device 110. Zone 1 is within a range of, for example, 10 m to 6 m. The responder device 110 authenticates the initiator device 120 to establish a secure BLE connection. BLE consumes less power than UWB.

2. Zone 2 (Six to Three Meters From Response Device 110)

As the initiator device 120 continues to approach the responder device 110, it enters zone 2, which is in a range of, for example, 6 m to 3 m. The responder device 110 performs an intent algorithm using BLE to determine its confidence that the initiator device 120 actually intends to approach the responder device 110.

3. Zone 3 (Three Meters to Door Handle of Responder Device 110)

Continuing its approach, the initiator device 120 enters zone 3, which is within a range of, for example, 3 m to a door handle of the responder device 110. The responder device 110 initiates a secure HRP UWB ranging session with the initiator device 120 in accordance with the CCC Specification to confirm the initiator device 120's intent to approach and its trustworthiness. UWB consumes more power than BLE.

The number and sizes of the zones are examples and not intended to be limiting.

II. Approach Intent Probability

A. Method Overview

As an overview, the responder device 110 determines the probability that the initiator device 120 intends to open its door. This determination is based on an integration of an approach intent probability. Initially, the initiator device 120 approaches the responder device 110. If the initiator device 120 stops approaching, the approach intent probability decreases. Conversely, if the initiator device 120 begins approaching again, the approach intent probability increases.

The determination of this approach intent probability is different for the smartphone than for the key FOB. For the smartphone, the events of the smartphone approaching the responder device 110 are given more weight than for the key FOB because the key FOB has less battery power to waste. Indecision in the case of a key FOB is more heavily penalized in the approach intent probability weighting to effectively delay the initiation of the secure ranging session to optimize power consumption in the key FOB. When the approach intent probability becomes higher than a predetermined approach intent probability threshold, the responder device 110 decides to unlock the door.

Figure 2:
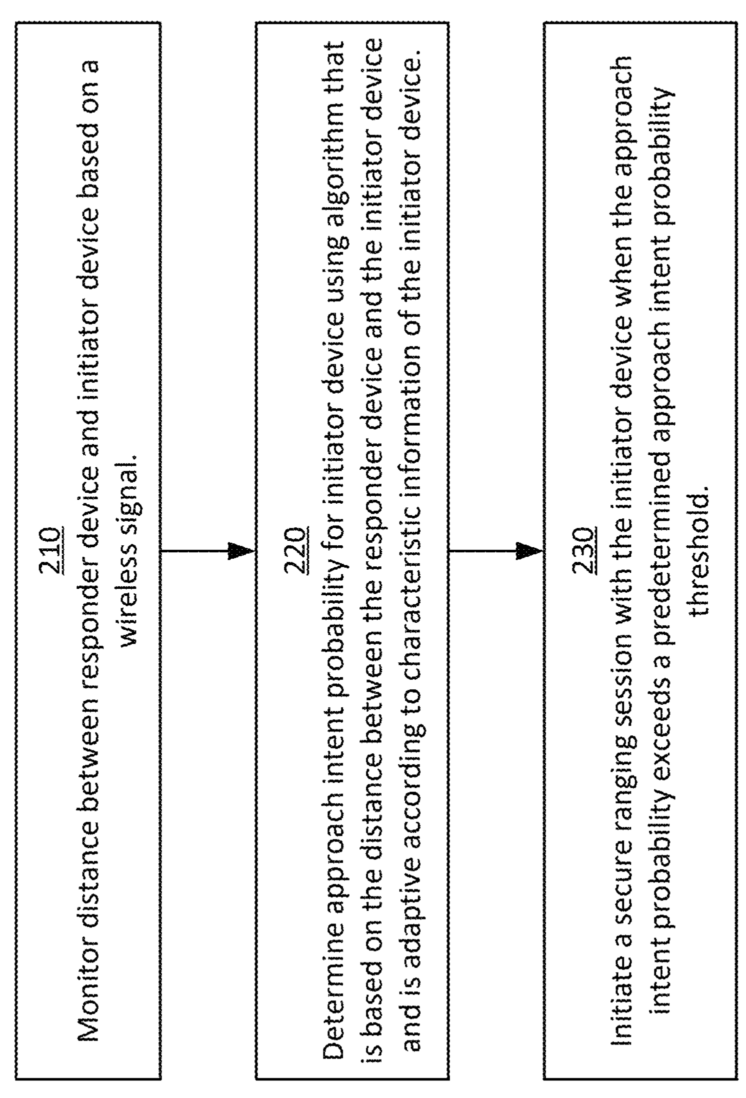
FIG. 2 illustrates a flowchart of a method, in accordance with aspects of the disclosure.

FIG. 2 illustrates a flowchart of a method, in accordance with aspects of the disclosure.

The responder device 110 monitors the distance between it and the initiator device 120 based on the wireless signal 130. (Step 210.) The wireless signal 130 from the initiator device 120 includes a ranging intent message with characteristic information about the initiator device 120. This characteristic information includes whether the initiator device 120 is a key FOB or another type of device, such as a smartphone.

The responder device 110 determines an approach intent probability for the initiator device 120 using an algorithm that is based on the distance between the responder device 110 and the initiator device 120 and is adaptive according to the characteristic information of the initiator device 120. (Step 220.) Optionally, the initiator device 120 may determine approach intent probability using one or more BLE modules 112 or BLE channel sounding to enhance localization before the responder device 110 initiates a UWB secure ranging session with the initiator device 110.

When the characteristic information indicates that the initiator device 120 is a key FOB, the algorithm is adaptive to optimize its performance. For example, the algorithm effectively delays the initiation of the secure ranging session to optimize power consumption in the key FOB. Performance optimization options are discussed further below.

The responder device 110 initiates a secure ranging session with the initiator device 120 when the approach intent probability exceeds a predetermined approach intent probability threshold. (Step 230.)

B. Approach Intent Probability Determination

FIG. 3 illustrates a graph 300 of signal strength versus time to determine the probability of approach intent for the initiator device 120, in accordance with aspects of the disclosure. The signal strength could be derived from BLE received signal strength indicator (RSSI) or BLE channel sounding, for example. The distance between the responder device 110 and the initiator device 120 correlates with the strength of the wireless signals 130. The bolded curve represents path 310 of the initiator device 120 as it approaches the responder device 110.

Curve 310 shows local maxima 320 and local minima 330, representing a device user's change in intent to approach the responder device 110. In the case of the device user stopping, a derivative of the approach intent probability for the initiator device 120 is zero, represented as follows:

$$\sum_{t_{BLE\,conn}}^{t_{door\,handle\,touch}} \frac{df\text{ (device ranging intent)}}{dt} = 0 \qquad (1)$$

A local maxima 320 is a point on curve 310 whose signal strength coordinate is greater than all other signal strength coordinates on curve 310 at points near that point. The local maxima 320 represents the device user's change of intent and beginning to walk away from the responder device 110. The local maxima 320 is identified when a second derivative of the approach intent probability for the initiator device 120 is less than zero, represented as:

$$\sum_{t_{BLE\,conn}}^{t_{door\,handle\,touch}} \frac{df^2\text{ (device ranging intent)}}{dt^2} < 0 \qquad (2)$$

Conversely, a local minima 330 is a point on curve 310 whose signal strength coordinate is less than all other signal strength coordinates on curve 310 at points near that point. The local minima 330 represents the device user's change of intent and started walking toward the responder device 110. The local minima 330 is identified when a second derivative of the approach intent probability for the initiator device 120 is greater than zero, represented as:

$$\sum_{t_{BLE\,conn}}^{t_{door\,handle\,touch}} \frac{df^2\text{ (device ranging intent)}}{dt^2} > 0 \qquad (3)$$

The responder device 110 updates the approach intent probability for the initiator device 120 based on maxima 320 or minima 330 of the curve 310 of distance over time. Specifically, the responder device 110 updates the approach intent probability by decreasing the approach intent probability in response to the maxima 320, representing an increase in the distance between the responder device 110 and the initiator device 120 or increasing the approach intent probability in response to the minima 330 representing a decrease in the distance between the responder device 110 and the initiator device 120. In addition, the responder device 110 updates the approach intent probability for the initiator device 120 by a weighting dependent on the characteristic information of the initiator device 120.

The CCC Specification includes a DR_Intent parameter, which is a 1-byte parameter used to store an approach confidence level. A portion of this parameter is a reserved code [x03-xFF] used to store the smartphone versus key FOB characteristic, as well as additional parameters that could be related to power savings, such as the weightage.

The responder device 110 may optionally store changing signal strengths of the wireless signals 130 and corresponding times in a matrix, such as:

$$\begin{bmatrix} f(\text{device ranging intent Door handle touch}) & t_{door\ handle\ touch} \\ f(\text{device ranging intent } m) & t_m \\ \ldots & \ldots \\ f(\text{device ranging intent } n) & t_n \\ f(\text{device ranging intent } BLE\ conn & t_{BLE\ conn} \end{bmatrix}, \quad (4)$$

where m and n represent indexes of time. The signal strength corresponds with the distance between the initiator device 120 and the responder device 120.

FIG. 4 illustrates a table 400 of a sum of approach intent probability for the initiator device 120 by distance zone, in accordance with aspects of the disclosure.

The responder device 110 updates the approach intent probability for the initiator device 120 based on the maxima 320 or minima 330, with a weightage depending on a distance zone of the three distance zones in which the initiator device 120 is located.

1. Zone 1

Zone 1 is the distance zone farthest from, but within a wireless communication range of, the responder device 110, for example, in a range of 10 to 6 meters. When the initiator device 120 is in zone 1, the responder device 110 updates the approach intent probability in response to the maxima 320 by increasing it by a greater weightage if the characteristic information of the initiator device 120 indicates that it is a key FOB as opposed to another type of device.

2. Zone 2

Zone 2 is the distance zone adjacent to the distance zone 3 that is closest to the responder device, for example, in a range of 6 to 3 meters. When the initiator device 120 is in zone 2, the responder device 110, in response to the minima 330, maintains the approach intent probability if the characteristic information of the initiator device 120 indicates that it is a key FOB, and otherwise increases it.

3. Zone 3

Zone 3 is the closest distance zone to the responder device 110, for example, from 3 meters to the door handle of the responder device 110. When the initiator device 120 is in zone 3, the responder device 110 updates the approach intent probability by increasing it, in response to the minima 330 by a weightage independent of the characteristic information of the initiator device 120.

If the characteristic information indicates that the initiator device 120 is a key FOB, the responder device 110 updates the approach intent probability for the initiator device by a greater weightage than if the initiator device 120 were a smartphone. As a result, the responder device 110 makes a lock-unlock determination in a fewer number of UWB ranging rounds during an HRP UWB secure ranging session with the initiator device 110. For example, the weightage assigned to the approach probability by the responder device 110 is greater when the initiator device 120 is a smartphone, indicating, for example, a confidence level of 0.75 that the user intends to unlock the vehicle, as opposed to 0.5 for a key FOB. This is because smartphones have greater power resources, allowing them to prioritize the user experience.

Within approximately one meter, the responder device 110 has sufficient confidence that the initiator device 120 intends to unlock the responder device door, and the responder device 110 decides to unlock itself.

This disclosure is generally directed to the case where the initiator device 120 is a key FOB and the goal is to conserve power in the key FOB. However, in an alternative or additional aspect, when the characteristic information indicates that the initiator device 120 is a smartphone, the responder device 110 may participate in the secure ranging session using a key FOB profile to optimize the performance of the smartphone.

C. Key FOB Performance Optimization

FIG. 6 illustrates a table 600 of CCC Specification parameters that are optimizable in accordance with aspects of the disclosure. These parameters are examples, and the disclosure is not limited thereto.

If the characteristic information indicates that the initiator device 120 is a key FOB rather than a smartphone, the algorithm of the responder device 110 is adaptive to optimize its performance. The performance optimization may be achieved in any of a number of ways.

The UWB modules 114 use AoA techniques to determine the location of the initiator device 120. However, UWB consumes more power than BLE. While a smartphone can tolerate higher battery consumption, a key FOB should conserve power by reducing the number of HRP UWB ranging rounds during the secure ranging session. To accomplish this, the responder device 110 delays the start of the UWB ranging session for a key FOB to conserve its power. This is facilitated by the responder device 110 assigning a weightage to the approach intent probability determination to result in a lock-unlock determination with fewer UWB ranging rounds. In addition, during intervals between UWB ranging sessions, BLE channel sounding may be used to further delay the resumption of the UWB ranging session to conserve key FOB power.

Additionally or alternatively, the responder device 110 may optimize the negotiation of a RAN (Ranging Area Network) multiplier, $$N_{RAN}^k,$$

to be equal to one, where k represents a ranging session index. This enables a minimum ranging block length of 96 msec and prioritizes a maximum number of UWB modules 114 on the responder device 110 to increase confidence for each ranging round of a secure ranging session with the initiator device 120. If the initiator device 110 were a smartphone, the ranging block length would be 288 msec instead of 96 msec, so the ranging block length for a key FOB would be almost three times less.

Figure 5:
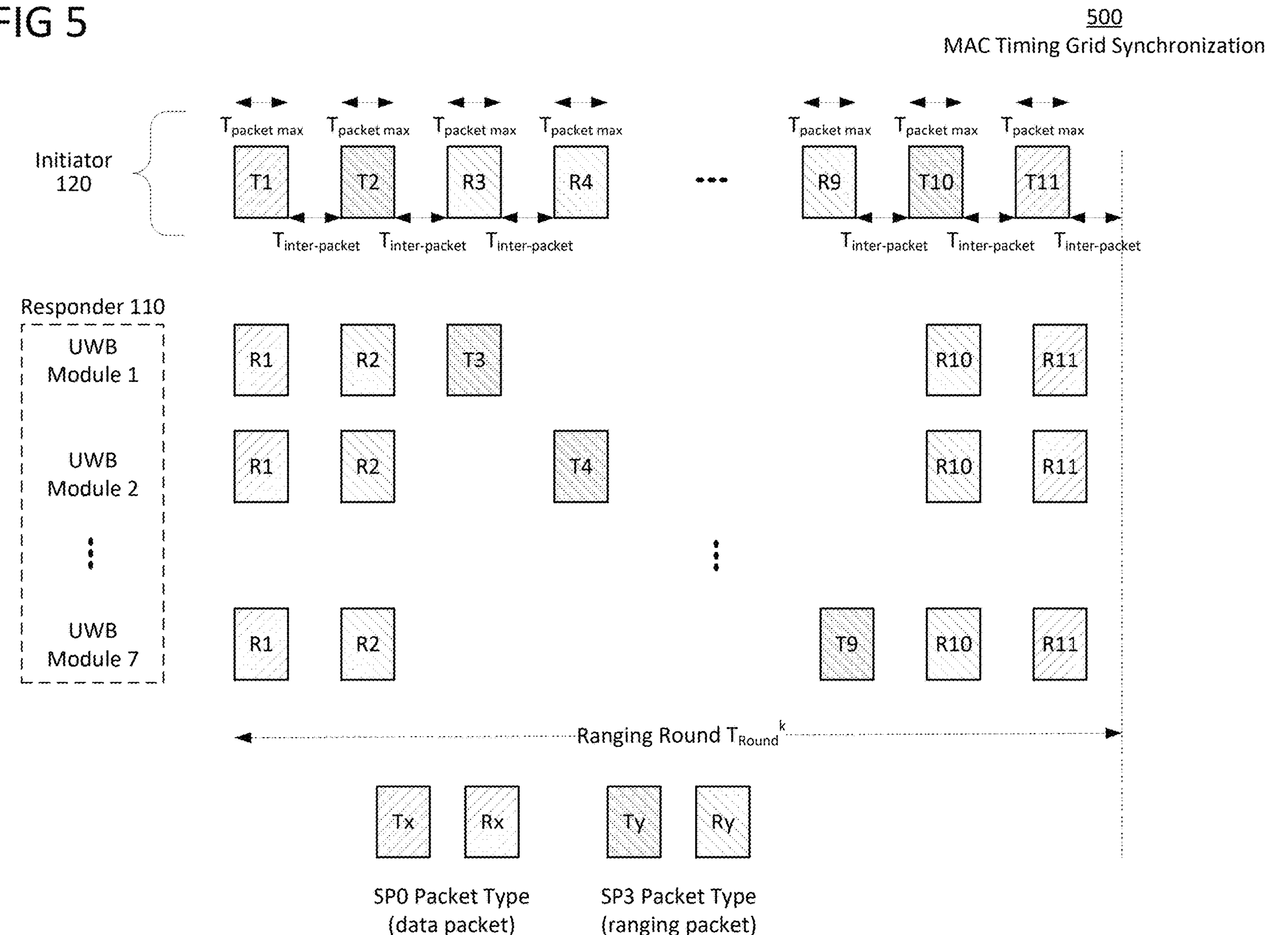
FIG. 5 illustrates medium access control (MAC) timing grid synchronization for a ranging round of a secure UWB ranging session, in accordance with aspects of the disclosure.

FIG. 5 illustrates medium access control (MAC) timing grid synchronization 500 during a ranging round of a secure UWB ranging session, in accordance with aspects of the disclosure. This grid is from the known CCC specification, and thus, a detailed description is omitted for the sake of brevity.

The UWB ranging protocol is a one-to-many ranging protocol between the initiator device 120 and the responder device 110, which in this example has seven UWB modules 114. The time reference for each ranging session is relative to an initiator clock. In the figure, SP0 packets are data packets for matching device capabilities, and SP3 packets are ranging packets.

The responder device 110 may select $$N^k_{Chap\_per\_slot},$$

which represents the shortest slot duration common to the slot durations supported by the initiator device 120 and the responder device 110 spacing in the MAC timing grid, to be equal to three, to enable a maximum AoA calculation.

Inter-packet spacing, Tinter packet, is advantageous in environments with background noise. To optimize power consumption, the inter-packet spacing of the key FOBs should be minimized while ensuring resilience to interference. For example, the key FOB spacing is $$N^k_{Chap\_per\_slot} = 3 \text{ versus } N^k_{Chap\_per\_slot} = 6 \text{ for smartphones.}$$

Smartphones, due to their battery capacity, can accommodate wider spacings.

By exploiting the distinction between a key FOB and a smartphone as the initiator device 120, the device intent algorithm can be optimized for both power savings and user experience. In addition, the MAC timing grid selection can be optimized for the number of AoA calculations per ranging block duration based on the initiating device.

The processor circuitry 116 may control the overall operations of the responder device 110 and include at least one processor, such as a central processing unit (CPU) or a graphics processing unit (GPU). The processor circuitry 116 may control other components included in the responder device 110 to perform operations in accordance with aspects of the disclosure. For example, processor circuitry 116 may execute a program stored in the memory, read a file stored in the memory, or store a new file in the memory.

The memory may include any type of storage medium among a flash memory, a hard disk-type memory, multimedia card micro-type memory, a card-type memory (e.g., a secure digital (SD) or extreme digital (XD) memory), a random access memory (RAM), a static RAM (SRAM), a read-only memory (ROM), an electrically erasable programmable ROM (EEPROM), a programmable ROM (PROM), a magnetic memory, a magnetic disk, an optical disk, and the like.

The disclosure's aspects are described using the CCC Specification, although this is not intended to be limiting. The aspects described herein may be applicable in other contexts.

The techniques of this disclosure may also be described in the following examples.

Example 1. A responder device, comprising: a wireless module operable to receive a wireless signal from an initiator device; and processor circuitry coupled to the wireless module and operable to: monitor a distance between the responder device and the initiator device based on the wireless signal; determine an approach intent probability for the initiator device using an algorithm that is based on the distance between the responder device and the initiator device and is adaptive according to characteristic information of the initiator device; and initiate a secure ranging session with the initiator device when the approach intent probability exceeds a predetermined approach intent probability threshold.

Example 2. The responder device of example 1, wherein the characteristic information indicates whether the initiator device is a key FOB (Frequency Operated Button) as opposed to another type of device.

Example 3. The responder device of any one or more of examples 1-2, wherein the algorithm is adaptive to optimize performance of the key FOB.

Example 4. The responder device of any one or more of examples 1-3, wherein the processor circuitry is further operable to: determine the approach intent probability for the initiator device using the algorithm to effectively delay the initiation of the secure ranging session to optimize power utilization when the characteristic information indicates that the initiator device is a key FOB.

Example 5. The responder device of any one or more of examples 1-4, wherein when the characteristic information indicates that the initiator device is a key FOB, as opposed to a smartphone, the processor circuitry is further operable to: optimize negotiation of a RAN (Ranging Area Network) multiplier, $$N^k_{RAN},$$

to be equal to one, with k representing a ranging session index, to enable a minimum ranging block length of 96 ms, and prioritize a maximum number of Ultra Wide Band (UWB) devices on the responder device to increase confidence for each ranging round of a secure ranging session with the initiator device; and/or select $$N^k_{Chap\_per\_slot},$$

which represents a shortest slot duration that is common between slot durations supported by the initiator device and by the responder device spacing in a Medium Access Control (MAC) timing grid, to be equal to three, to enable a maximum number of Angle of Arrival (AoA) calculations.

Example 6. The responder device of any one or more of examples 1-5, wherein the processor circuitry is further operable to: update the approach intent probability for the initiator device based on maxima or minima of a curve of the distance over time and by a weightage dependent on the characteristic information of the initiator device.

Example 7. The responder device of any one or more of examples 1-6, wherein when the characteristic information indicates that the initiator device is a key FOB (Frequency Operated Button) as opposed to a smartphone, the processor circuitry is further operable to: update the approach intent probability for the initiator device by a greater weightage; and make a lock-unlock determination in fewer UWB (Ultra Wide Band) ranging rounds of a secure ranging session with the initiator device.

Example 8. The responder device of any one or more of examples 1-7, wherein the processor circuitry is further operable to update the approach intent probability by:

decreasing the approach intent probability in response to the maxima, which represents an increase in the distance between the responder device and the initiator device; or increasing the approach intent probability in response to the minima, which represents a decrease in the distance between the responder device and the initiator device.

Example 9. The responder device of any one or more of examples 1-8, wherein the processor circuitry is operable in accordance with Car Connectivity Consortium digital key specification with a DR_Intent parameter reserved code [x03-xFF] to indicate a weightage of the approach intent probability to optimize power utilization over time in the initiator device.

Example 10. The responder device of any one or more of examples 1-9, wherein: an area surrounding the responder device is divided into a plurality of distance zones, and the processor circuitry is further operable to: update the approach intent probability for the initiator device based on the maxima or minima by a weightage that is dependent on a distance zone of the plurality of distance zones in which the initiator device is located.

Example 11. The responder device of any one or more of examples 1-10, wherein the processor circuitry is further operable to update the approach intent probability by: increasing the approach intent probability in response to the minima by a weightage that is independent of the characteristic information of the initiator device, when the initiator device is in a distance zone of the plurality of distance zones that is closest to the responder device.

Example 12. The responder device of any one or more of examples 1-11, wherein the distance zone of the plurality of distance zones closest to the responder device is an Ultra Wide Band (UWB) zone, and the other of the plurality of distance zones is/are Bluetooth Low Energy (LE) zone(s).

Example 13. The responder device of any one or more of examples 1-12, wherein when the initiator device is in a distance zone of the plurality of distance zones adjacent to a distance zone that is closest to the responder device, the processor circuitry is further operable to update the approach intent probability by: in response to the minima, maintaining the approach intent probability if the characteristic information of the initiator device indicates that the initiator device is a key FOB (Frequency Operated Button) and increasing the approach intent probability otherwise.

Example 14. The responder device of any one or more of examples 1-13, wherein the processor circuitry is further operable to update the approach intent probability by: in response to the maxima, increasing the approach intent probability by a greater weightage if the characteristic information of the initiator device indicates that the initiator device is a key FOB (Frequency Operated Button) as opposed to another type of device when the initiator device is in a distance zone of the plurality of distance zones that is farthest from the responder device and within a wireless communication range of the responder device.

Example 15. The responder device of any one or more of examples 1-14, wherein the wireless signal from the initiator device includes a ranging intent message having the characteristic information of the initiator device.

Example 16. The responder device of any one or more of examples 1-15, wherein the processor circuitry coupled to the wireless module and operable to: store signal strengths of the wireless signal and corresponding times in a matrix, wherein the distance between the responder device and the initiator device correlates with the signal strengths, and the signal strengths of the wireless signal are derivable from Bluetooth low energy (BLE) received signal strength indicator (RSSI) or BLE channel sounding.

Example 17. The responder device of any one or more of examples 1-16, wherein the characteristic information indicates that the initiator device is a smartphone, and the processor circuitry is further operable to: participate in the secure ranging session using a key FOB (Frequency Operated Button) profile to optimize performance of the smartphone.

Example 18. A method, performed by a responder device operable to receive a wireless signal from an initiator device, the method comprising: monitoring a distance between the responder device and the initiator device based on the wireless signal; determining an approach intent probability for the initiator device using an algorithm that is based on the distance between the responder device and the initiator device and is adaptive according to characteristic information of the initiator device; and initiating a secure ranging session with the initiator device when the approach intent probability exceeds a predetermined approach intent probability threshold.

Example 19. The method of example 18, wherein the characteristic information indicates whether the initiator device is a key FOB (Frequency Operated Button) as opposed to another type of device.

Example 20. The method of any one or more of examples 17-19, further comprising: determining the approach intent probability for the initiator device using the algorithm to effectively delay the initiation of the secure ranging session to optimize power utilization when the characteristic information indicates that the initiator device is a key FOB.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

The invention claimed is:

1. A responder device, comprising:

a wireless module operable to receive a wireless signal from an initiator device; and processor circuitry coupled to the wireless module and operable to:

monitor a distance between the responder device and the initiator device based on the wireless signal;

determine an approach intent probability for the initiator device using an algorithm that is based on the distance between the responder device and the initiator device and is adaptive according to characteristic information of the initiator device, wherein the characteristic information indicates whether the initiator device is a key FOB (Frequency Operated Button) as opposed to another type of device, and wherein the algorithm is adaptive to optimize performance of the key FOB;

initiate a secure ranging session with the initiator device when the approach intent probability exceeds a predetermined approach intent probability threshold; and determine the approach intent probability for the initiator device using the algorithm to effectively delay the initiation of the secure ranging session to optimize power utilization when the characteristic information indicates that the initiator device is the key FOB.

2. The responder device of claim 1, wherein when the characteristic information indicates that the initiator device is the key FOB, as opposed to a smartphone, the processor circuitry is further operable to:

optimize negotiation of a RAN (Ranging Area Network) multiplier, $$N_{RAN}^{k},$$

to be equal to one, with k representing a ranging session index, to enable a minimum ranging block length of 96 ms, and prioritize a maximum number of Ultra Wide Band (UWB) devices on the responder device to increase confidence for each ranging round of a secure ranging session with the initiator device; and/or select $$N_{Chap\_per\_slot}^{k},$$

which represents a shortest slot duration that is common between slot durations supported by the initiator device and by the responder device spacing in a Medium Access Control (MAC) timing grid, to be equal to three, to enable a maximum Angle of Arrival (AoA) calculation.

3. The responder device of claim 1, wherein the processor circuitry is further operable to:

update the approach intent probability for the initiator device based on maxima or minima of a curve of the distance over time and by a weightage dependent on the characteristic information of the initiator device.

4. The responder device of claim 1, wherein when the characteristic information indicates that the initiator device is the key FOB as opposed to a smartphone, the processor circuitry is further operable to:

update the approach intent probability for the initiator device by a greater weightage; and make a lock-unlock determination in fewer UWB (Ultra Wide Band) ranging rounds of a secure ranging session with the initiator device.

5. The responder device of claim 3, wherein the processor circuitry is further operable to update the approach intent probability by:

decreasing the approach intent probability in response to the maxima, which represents an increase in the distance between the responder device and the initiator device; or increasing the approach intent probability in response to the minima, which represents a decrease in the distance between the responder device and the initiator device.

6. The responder device of claim 1, wherein the processor circuitry is operable in accordance with Car Connectivity Consortium digital key specification with a DR_Intent parameter reserved code [x03-xFF] to indicate a weightage of the approach intent probability to optimize power utilization over time in the initiator device.

7. The responder device of claim 6, wherein:

an area surrounding the responder device is divided into a plurality of distance zones, and the processor circuitry is further operable to:

update the approach intent probability for the initiator device based on the maxima or minima by a weightage that is dependent on a distance zone of the plurality of distance zones in which the initiator device is located.

8. The responder device of claim 7, wherein the processor circuitry is further operable to update the approach intent probability by:

increasing the approach intent probability in response to the minima by a weightage that is independent of the characteristic information of the initiator device, when the initiator device is in a distance zone of the plurality of distance zones that is closest to the responder device.

9. The responder device of claim 8, wherein the distance zone of the plurality of distance zones closest to the responder device is an Ultra Wide Band (UWB) zone, and the other of the plurality of distance zones is/are Bluetooth Low Energy (LE) zone(s).

10. The responder device of claim 7, wherein when the initiator device is in a distance zone of the plurality of distance zones adjacent to a distance zone that is closest to the responder device, the processor circuitry is further operable to update the approach intent probability by:

in response to the minima, maintaining the approach intent probability if the characteristic information of the initiator device indicates that the initiator device is the key FOB and increasing the approach intent probability otherwise.

11. The responder device of claim 7, wherein the processor circuitry is further operable to update the approach intent probability by:

in response to the maxima, increasing the approach intent probability by a greater weightage if the characteristic information of the initiator device indicates that the initiator device is the key FOB as opposed to another type of device when the initiator device is in a distance zone of the plurality of distance zones that is farthest from the responder device and within a wireless communication range of the responder device.

12. The responder device of claim 1, wherein the wireless signal from the initiator device includes a ranging intent message having the characteristic information of the initiator device.

13. The responder device of claim 1, wherein the processor circuitry coupled to the wireless module and operable to:

store signal strengths of the wireless signal and corresponding times in a matrix, wherein the distance between the responder device and the initiator device correlates with the signal strengths, and the signal strengths of the wireless signal are derivable from Bluetooth low energy (BLE) received signal strength indicator (RSSI) or BLE channel sounding.

14. The responder device of claim 1, wherein the characteristic information indicates that the initiator device is a smartphone, and the processor circuitry is further operable to:

participate in the secure ranging session using the key FOB profile to optimize performance of the smartphone.

15. A method, performed by a responder device operable to receive a wireless signal from an initiator device, the method comprising:

monitoring a distance between the responder device and the initiator device based on the wireless signal;

determining an approach intent probability for the initiator device using an algorithm that is based on the distance between the responder device and the initiator device and is adaptive according to characteristic information of the initiator device, wherein the characteristic information indicates whether the initiator device is a key FOB (Frequency Operated Button) as opposed to another type of device;

initiating a secure ranging session with the initiator device when the approach intent probability exceeds a predetermined approach intent probability threshold; and determining the approach intent probability for the initiator device using the algorithm to effectively delay the initiation of the secure ranging session to optimize power utilization when the characteristic information indicates that the initiator device is the key FOB.

* * * * *